US007027391B2

(12) United States Patent
Sahinoglu et al.

(10) Patent No.: US 7,027,391 B2
(45) Date of Patent: Apr. 11, 2006

(54) ADAPTIVE BANDWIDTH ALLOCATION BY WAVELET DECOMPOSITION AND ENERGY ANALYSIS OF NETWORK TRAFFIC

(75) Inventors: Zafer Sahinoglu, Clifton, NJ (US); Fernando M. Matsubara, Gillette, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1147 days.

(21) Appl. No.: 09/842,973

(22) Filed: Apr. 26, 2001

(65) Prior Publication Data
US 2003/0021295 A1    Jan. 30, 2003

(51) Int. Cl.
    *H04J 1/16*    (2006.01)
(52) U.S. Cl. .................................. 370/229; 370/468
(58) Field of Classification Search ............... 370/232, 370/235, 412, 468
    See application file for complete search history.

(56) References Cited

U.S. PATENT DOCUMENTS

| 5,311,310 | A  | * | 5/1994 | Jozawa et al. ......... 375/240.13 |
| 6,292,466 | B1 | * | 9/2001 | Droz ......................... 370/232 |
| 6,452,933 | B1 | * | 9/2002 | Duffield et al. ............ 370/415 |
| 6,519,004 | B1 | * | 2/2003 | Bahl ...................... 348/385.1 |
| 6,584,111 | B1 | * | 6/2003 | Aweya et al. ............... 370/412 |

OTHER PUBLICATIONS

Garrett, et al., "Analysis, Modeling and Generation of Self-Similar VBR Video Traffic"; ACM SIGCOMM, London, 1994. pp. 269-280.
H. Saran, S. Keshav, "*An empirical Evaluation of Virtual Circuit Holding Times in IP over ATM Networks*," Proc. of INFOCOM 1994.
Y. Afek, M. Cohen, E. Haalman, Y. Mansour, "*Dynamic Bandwidth Allocation Policies*," 0743-166x/96 IEEE.
S. K. Biswas, R. Izmailov, "*Design of a fair Bandwidth allocation Policy for VBR Traffic in ATM Networks*," IEEE/ACM Trans. On Networking, V:8. N:2, Apr. 2000.
M. W. Garrett, W. Willinger, "*Analysis, Modeling, and Generation of Self-similar VBR Video Traffic*," ACM SIGCOMM, London, 1994.

(Continued)

*Primary Examiner*—Huy D. Vu
*Assistant Examiner*—Daniel J. Ryman
(74) *Attorney, Agent, or Firm*—Dirk Brinkman; Andrew J. Curtin

(57) ABSTRACT

A method dynamically allocates bandwidth for traffic having a variable data rate in a network. A data rate of the traffic received from the network is measured during fixed length time intervals. A predetermine number of consecutive data rates are grouped into overlapping vectors. A discrete wavelet transform is applied to each overlapping vector to determine frequency bands for each vector, and the frequency bands of each vector are analyzed to determine an associated energy of the data rate. Then, the bandwidth is allocated to the traffic according to the associated energy when the traffic is transmitted.

11 Claims, 14 Drawing Sheets

OTHER PUBLICATIONS

S. Chong, S. Li, J. Ghosh, "*Predictive Dynamic Bandwidth Allocation for Efficient Transport of Real Time VBR Video over ATM*," IEEE Journal on Selected Areas in Comm, V:13, N:1, pp. 12-23, 1995.

Zhang et al., "*RED-VBR: A new approach to support delay-sensitive VBR video in packet-switched networks*," Proc. NOSSDAV, pp. 258-272 1995.

Abry et al., in "*Wavelet Analysis of Long Range Dependent Traffic*," IEEE Trans. Inform. Theory, V:44, pp. 2-15, Jan. 1998.

Sahinoglu et al., in "*Self-similarity and Its Effects on Network Performance*," IEEE Comm. Magazine, Jan. 1999.

R. Riedi, M. S. Crouse, V. J. Ribeiro, R. G. Baraniuk, "*A Multifractal Wavelet Model with application to Network Traffic*," IEEE Trans. On Information Theory, V:45, N:3, Apr. 1999.

\* cited by examiner

ADAPTIVE BANDWIDTH ALLOCATION BY WAVELET DECOMPOSITION AND ENERGY ANALYSIS OF NETWORK TRAFFIC

FIELD OF THE INVENTION

The present invention relates generally to a method or system for allocating network resources for data streams, and more particularly to adaptive bandwidth allocation for bit streams in network QoS management blocks, traffic schedulers and routers.

BACKGROUND OF THE INVENTION

An asynchronous transfer mode (ATM) network provides connection-oriented communication services with a guaranteed bandwidth. To carry data in the ATM network, a virtual circuit (VC) with a predetermined bandwidth is allocated. An adaptation layer of the network protocol keeps the VC open as long as the data rate matches the allocated bandwidth, see H. Saran, S. Keshav, "*An empirical Evaluation of Virtual Circuit Holding Times in IP over ATM Networks,*" Proc. of INFOCOM 1994, Y. Afek, M. Cohen, E. Haalman, Y. Mansour, "*Dynamic Bandwidth Allocation Policies,*" 0743-166X/96 IEEE, and S. K. Biswas, R. Izmailov, "*Design of a fair Bandwidth allocation Policy for VBR Traffic in ATM Networks,*" IEEE/ACM Trans. On Networking, V:8, N:2, April 2000.

However, if the data rate changes, then the allocated bandwidth may need to be changed. Periodic rate adjustment methods measure and adjust the bandwidth at fixed time intervals, while adaptive methods attempt to adjust the bandwidth whenever a change is necessary. The adjustment can close the current VC and open a new one, or change the bandwidth allocation for the current VC.

Variable bit rate (VBR) data, e.g., compressed videos, pose a unique challenge because of rapid fluctuations in the bit rate. Specifically, for VBR video data, bandwidth requirements change due to unavoidable coding data structures. For example, MPEG uses B-frames, and group of pictures (GOP). Each GOP starts with an I-frame followed by a P-frame. B-frames have fewer bits than P- and I-frames. Motion activities also cause fluctuations in the bit rate because the number of bits in the P- and B-frames depend on the amount of motion in the video.

For VBR data, dynamic resource allocation is crucial, especially for traffic that is bursty in time scales from milliseconds to seconds or even minutes. This burstiness phenomenon at different time scales is called self-similarity, see M. W. Garrett, W. Willinger, "*Analysis, Modeling, and Generation of Self-similar VBR Video Traffic,*" ACM SIG-COMM, London, 1994. They found a relation between energy distribution of a signal in frequency domain and the level of traffic self-similarity. However, any analytical study that makes use of the link between self-similarity level and energy distribution to dynamically allocate network resources has not been done yet. It is known that increasing level of self-similarity of a traffic trace increases the required network resources to prevent QoS degradation, such as delay and packet loss rate. Therefore, a correct modeling and prediction of self-similar traffic and the quantification of the network resources to allocate in each resource renegotiation is non-trivial.

A number of dynamic bandwidth allocation methods are known, see U.S. Pat. Nos. 6,118,791 "*Adaptive bandwidth allocation method for non-reserved traffic in a high-speed data transmission network, and system for implementing said method,*" 5,991,308 "*Lower overhead method for data transmission using ATM and SCDMA over hybrid fiber coax cable plant,*" and 5,745,837 "*Apparatus and method for digital data transmission over a CATV system using an ATM transport protocol and SCDMA.*", also see S. Chong, S. Li, J. Ghosh, "Predictive Dynamic Bandwidth Allocation for Efficient Transport of Real Time VBR Video over ATM," IEEE Journal on Selected Areas in Comm, V:13, N:1, January 1995, pp. 12–23.

Typically, a predication is made, and a new allocation is based on the prediction and previous updates, see Chong, S. Li, J. Ghosh, "*Efficient Transport of real time VBR Video over ATM via Dynamic Bandwidth Allocation,*" University Of Texas at Austin, Austin, Tex. 78712, August 1995. The prediction can consider the overall, previous, or average bit rates, and buffer sizes, or combinations thereof. Peak-rate based methods result in a minimum number of updates. However, bandwidth is used inefficiently. Methods based on previous and average bit rates may not be able to match rapid changes in bit rates, causing delays.

Predicting exact bandwidth requirements in a network is a difficult problem. Clearly, the total bandwidth allocated during a session must at least match the total amount of data to be transmitted. If less than the required bandwidth is allocated, then some of the data must at least be delayed, or possibly irretrievably lost. If more than the required bandwidth is allocated, network resources are wasted. Therefore, it is desired to accurately predict traffic characteristics, and to dynamically allocate matching network resources accordingly.

Minimization of the number of renegotiations is also an important problem. Increasing the frequency of bandwidth renegotiations increases, and accordingly overload the network's signaling components. On the other hand, an inadequate number of renegotiations makes it difficult to follow traffic trends, and results in inefficient bandwidth utilization.

Setting the inter-negotiation times at fixed intervals (synchronous) is simple but not efficient. In asynchronous process, the bandwidth is adapted if and only if the demand exceeds a pre-assigned level. Traffic based renegotiation such as that introduced in the prior art, see Zhang et al., "*RED-VBR: A new approach to support delay-sensitive VBR video in packet-switched networks,*" Proc. NOSSDAV, pp. 258–272 1995, is asynchronous and is able to capture the near future bandwidth demand closely. However, a single very small or large video frame might cause high underutilization or over-utilization of the capacity for some time. The asynchronous operation can significantly reduce the adaptation frequency at the cost of decrease in utilization.

S. Chong, S. Li, J. Ghosh, "*Predictive Dynamic Bandwidth Allocation for Efficient Transport of Real Time VBR Video over ATM,*" IEEE Journal on Selected Areas in Comm, V:13, N:1, pp. 12–23, 1995, measures video traffic statistics in the frequency domain. They low pass filter the incoming traffic trace to capture the slow time variation of consecutive scene changes. However, they do not take high frequency components into account that can also demand non-negligible bandwidth.

Therefore, there is a need for improved generic method and system to dynamically allocate network resources to an applications traffic at asynchronously computed renegotiation times and with consideration of signal features in different frequency sub-bands.

SUMMARY OF THE INVENTION

The invention provides a method and system for adaptively allocating bandwidth for a variable rate traffic stream. More specifically, the invention provides a method and system for dynamically allocating network resources for data stream traffic in a network by taking into account the traffic features in frequency domain.

A dynamic mechanism uses wavelet filter banks to split an energy of a data stream into sub-frequency bands, and measures an energy of a data measuring process at an output of dyadic sub-band filters in frequency domain. The measured energy is then used to predict short and long term fluctuations in the incoming traffic pattern, and to adjust the bandwidth allocation accordingly. Whether a bandwidth renegotiation is needed is determined by a controller unit based on the new bandwidth prediction information and the comparison of mean and variance of the sub-band energies in the previous measurement and the current one measurement.

A method dynamically allocates bandwidth for traffic having a variable data rate in a network. A data rate of the traffic received from the network is measured during fixed length time intervals.

A predetermined number of consecutive data rates are grouped into overlapping vectors. A discrete wavelet transform is applied to each overlapping vector to determine frequency bands for each vector, and the frequency bands of each vector are analyzed to determine an associated energy of the data rate.

Then, the bandwidth is allocated to the traffic according to the associated energy when the traffic is transmitted.

BRIEF DESCRIPTION OF THE DRAWINGS

FIG. 1b is low level block diagram of the adaptive bandwidth allocation method and system of FIG. 1a;

DETAILED DESCRIPTION OF THE PREFERRED EMBODIMENT

As shown in FIG. 11a, a system and method 100 according to our invention decomposes time series network traffic data arrival rate information 101 into multiple frequency bands. The frequency bands are used to identify low and high frequency components in the data arrival rate. An energy distribution in each frequency band is determined in order to analyze 1050 short and long term fluctuations in the network traffic. We use the output of the analysis to dynamically allocate 800 bandwidth for data streams transmitted by the network 102.

Our unique energy distribution analysis enables better predictions of the bandwidth requirements than prior art techniques. Our method is applicable to both aggregate and individual applications traffic. Our method can be used to distribute an available bandwidth among multiple traffic data streams based on their frequency characteristics. More specifically, our invention can be deployed in weighted fair queuing (WFQ) processes to adaptively update weight coefficients of each traffic class entering into the VFQ process. Our invention can be used in quality-of-service (QoS) management blocks of network routers, switches, digital subscriber line access multiplexer (DSLAM), and the like.

Overview of System Structure

Figure 1A:
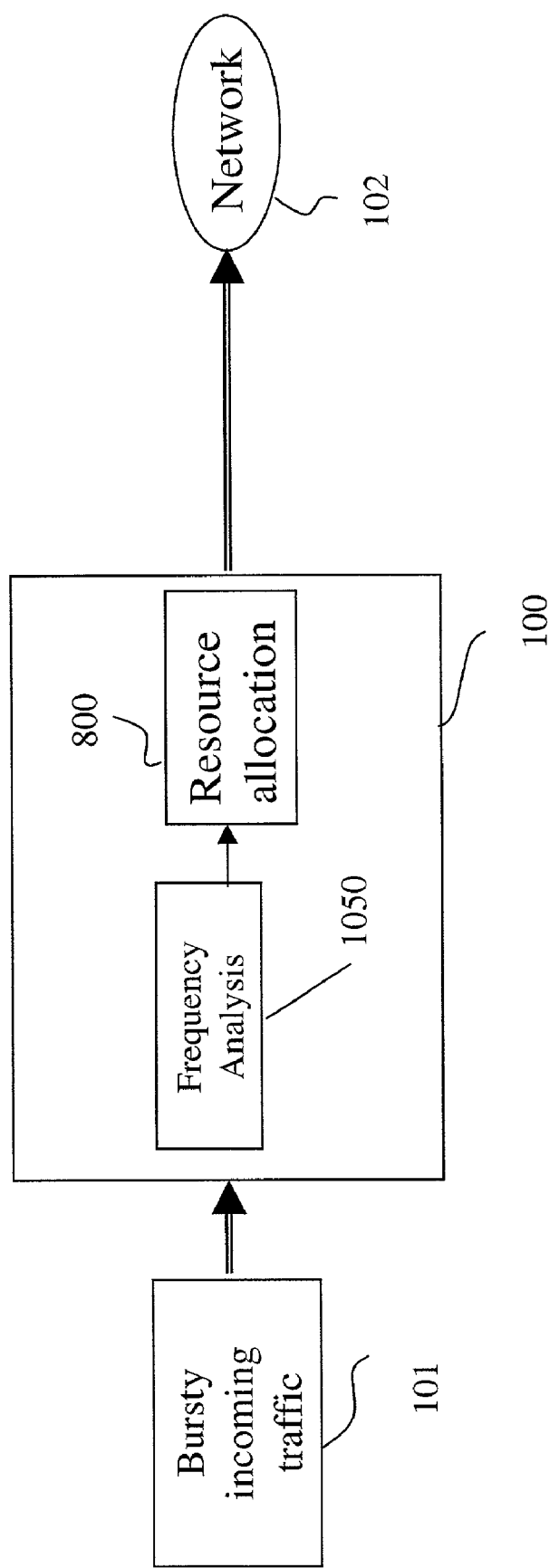
FIG. 1a is a high level block diagram of an adaptive bandwidth allocation method and system according to the invention.
Figure 1B:
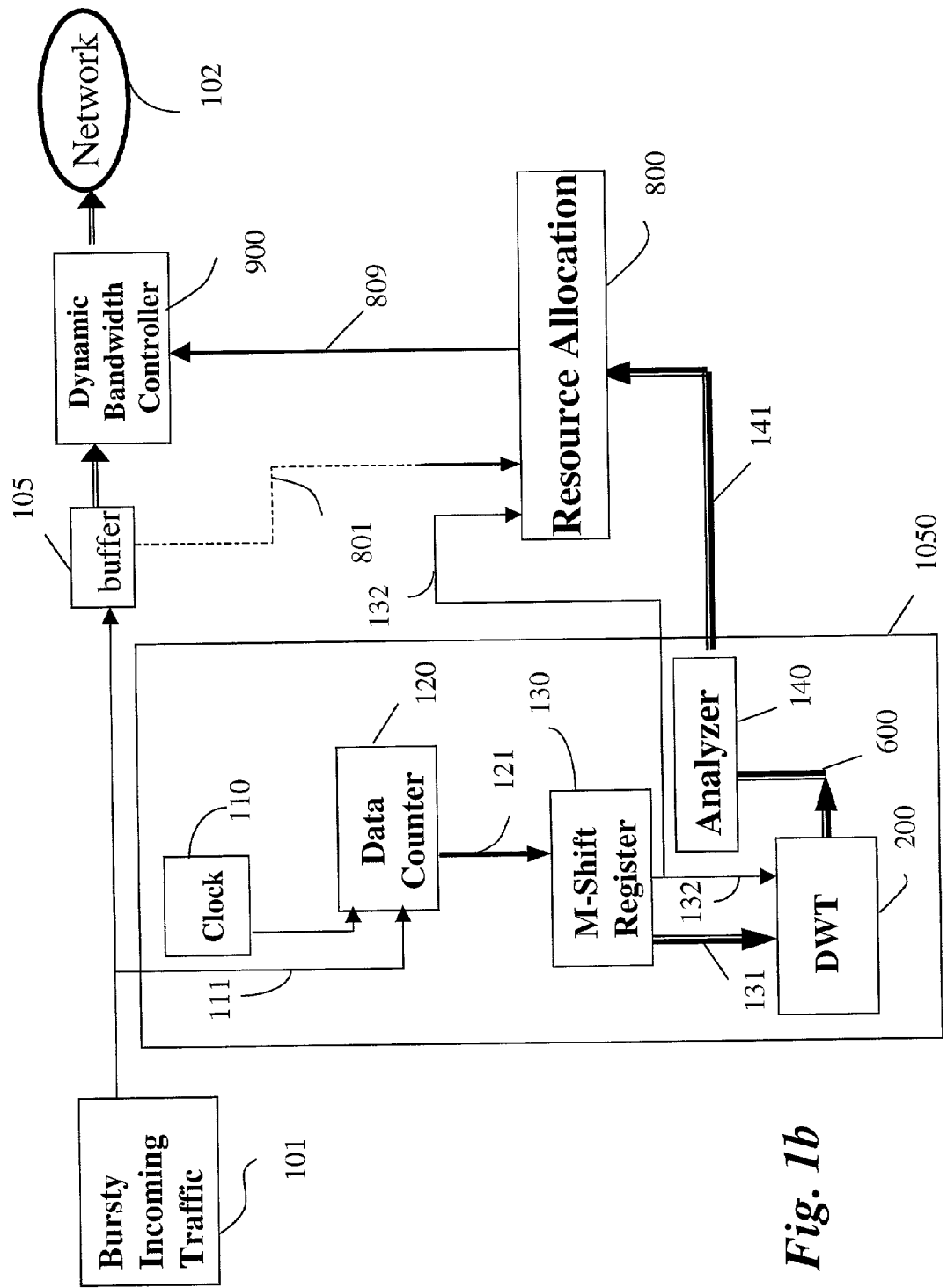

As shown in FIG. 1b, the system 100 according to our invention includes a clock 110 connected to a data counter 120. The data counter receives the incoming network traffic (data) 101. The network traffic is also presented to an output queue or buffer 105.

The output of the data counter 120 is connected to a shift register 130 of size M, for example eight. The shift register 130 is connected to a discrete wavelet transform unit (DWT) 200, e.g., a Haar wavelet filter bank. Specifically, we use a Haar-2 basis. An analyzer 140 processes the output of the DWT 200. The output of the analyzer is connected to resource allocation mechanism (RAM) 800.

The RAM 800 can also receive optional feedback parameters, e.g., buffer statistics 801, from the buffer 105 and a minimum non-zero value $X_{DC}$ 132 from 130. The output 809 from the RAM 800 drives a dynamic bandwidth controller (DBC) 900, which in turn, decides whether to start a renegotiation cycle with the network 102 based on the new prediction information and the comparison of previous and current variance and mean of the energy distribution in the sub-bands and sets a renegotiation flag 901. The DBC starts a renegotiation cycle with a network according to values of the renegotiation flag, e.g. renegotiate if the flag is one. If no renegotiation is decided, The DBC waits for the next prediction from the RAM 800. The DBC is also responsible for forwarding the buffered traffic onto the network 102 at the current negotiated data rates.

System Operation

The clock 110 sets time intervals $$\sum_n \delta(t - nT),$$

at a clock rate of $$\frac{1}{T}.$$

Figure 4:
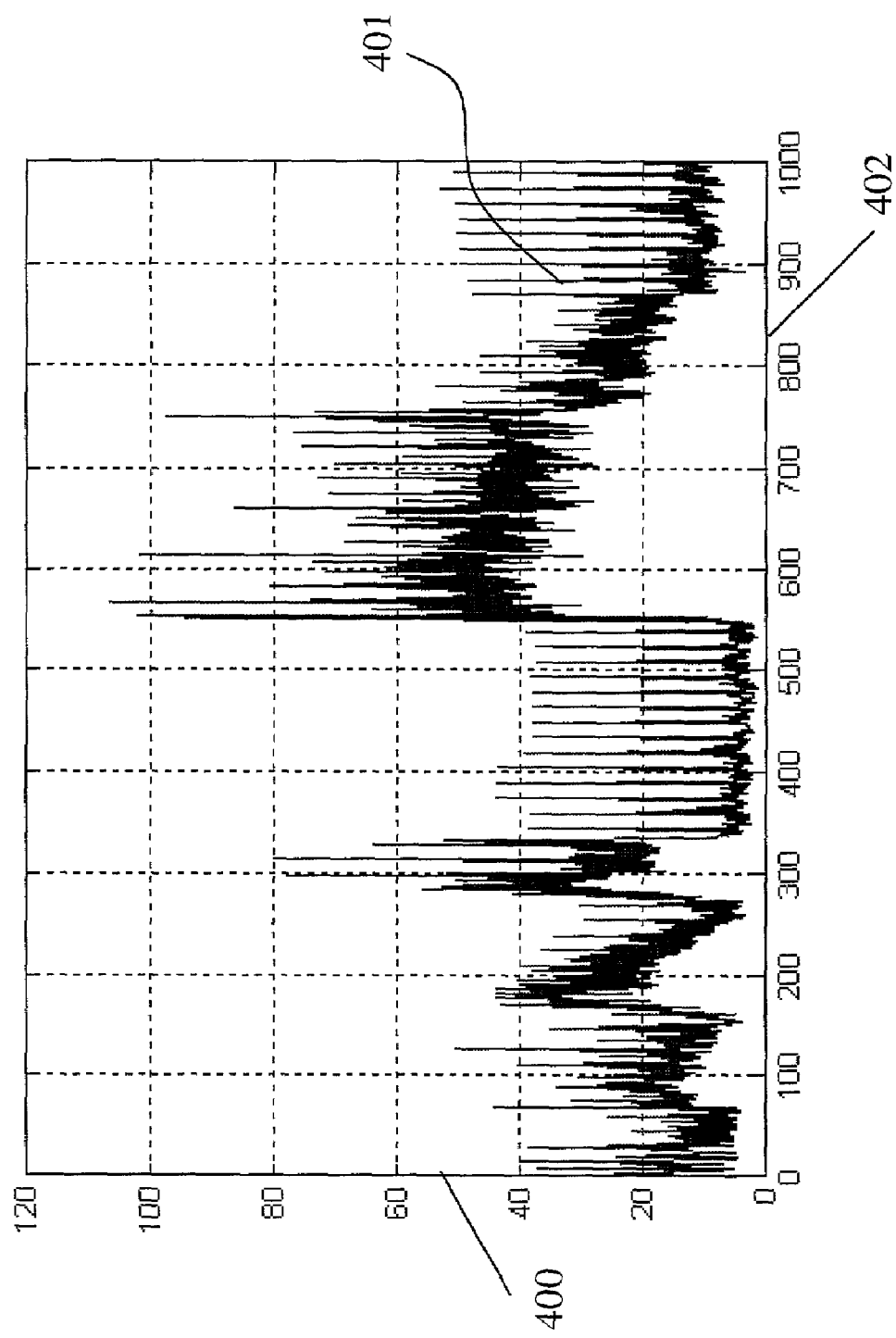
FIG. 4 is a trace of MPEG-4 video frame sizes over time.

During each time interval, the amount of data ($X_n$) 121 that is received at QoS management block is measured by in the data counter 120. The measured data 121 can be bits, bytes, packets, cells, etc. as shown in FIG. 4 for a thirty second MPEG-4 video trace 401 where the x-axis 402 is the index of frames transmitted and the y-axis 400 is the frame sizes in bits. The amount of data received in a given fixed length time interval essentially gives the instantaneous data rate during the interval. The most recent M values of the measured data rate are buffered in the shift register 130 as an integer vector $X_k=[X(n-M+1)X(n-M+2) \ldots X(n)]$ 131 and also the minimum non-zero sample 132 of the integer vector 131 is determined.

Figure 3:
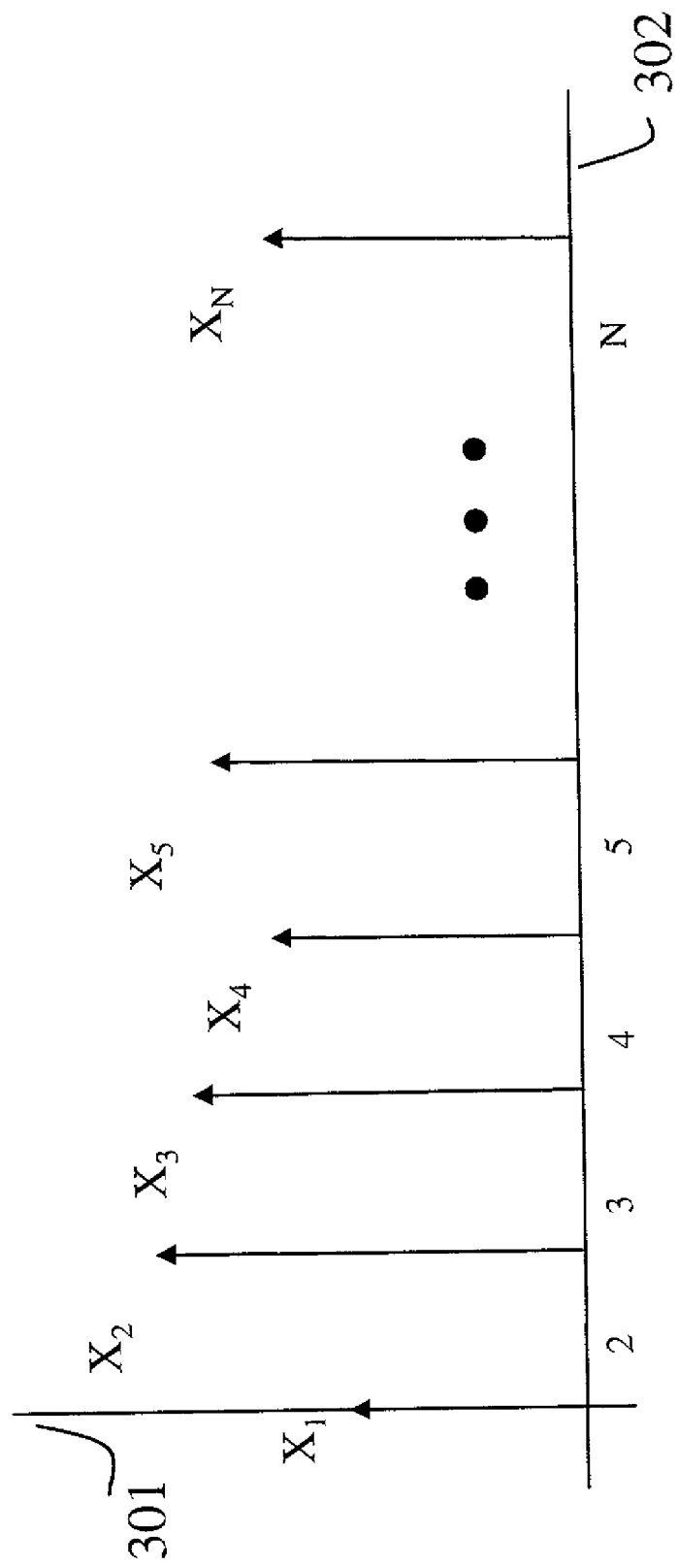
FIG. 3 is a graph of output of a data counter of the system of FIG. 1b.

FIG. 3 graphs data arrival rates 301 for consecutive time intervals 302 where each vector X has N elements.

In the vector 131, n is a time instance, k is a time scale, and M is an integer, e.g., eight samples. Each element $X(i)$ indicates the amount of data, e.g., bytes, received in a time slot i. For two consecutive time instances, the arrival rate information can be expressed by their sum and their difference. The difference reveals sharp changes in the arrival rate. An average arrival rate vector including M consecutive time slots is $$X_{k+1} = \tfrac{1}{2}\cdot[X(n-M+1)+X(n-M+2)X(n-M+3)+X(n-M+4), \ldots X(n-1)+X(n)] \tag{1}$$

at a time scale of k+1.

Difference of the arrivals of data between two consecutive time slots is denoted by a vector $Y_{k+1}$ such that $$Y_{k+1} = \tfrac{1}{2}\cdot[X(n-M+1)-X(n-M+2)X(n-M+3)-X(n-M+4), \ldots X(n-1)-X(n)] \tag{2}$$

Equations 1 and 2 can be rewritten in the general form $$X_{k+1}(i) = 0.5(X_k(2i-1)+X_k(2i)), \text{ and} \tag{3}$$

$$Y_{k+1}(n) = 0.5(Y_k(2i-1)-Y_k(2i)). \tag{4}$$

Discrete Wavelet Transform

We are interested in the dynamic behavior of the traffic as manifested by differences between consecutive samples. The data measuring steps can produce zero and positive integer values. Wavelet domain modeling of positive processes requires that a positive output is ensured. To guarantee that a process is positive, a sufficient and necessary condition is $|Y_{k,n}(i)| \leq Y_{k,n}(i)$. The Haar wavelet satisfies this constraint. Therefore, we use the Haar-2 wavelet. However, any wavelet satisfying the above condition can be used in the DWT block 200.

Figure 2:
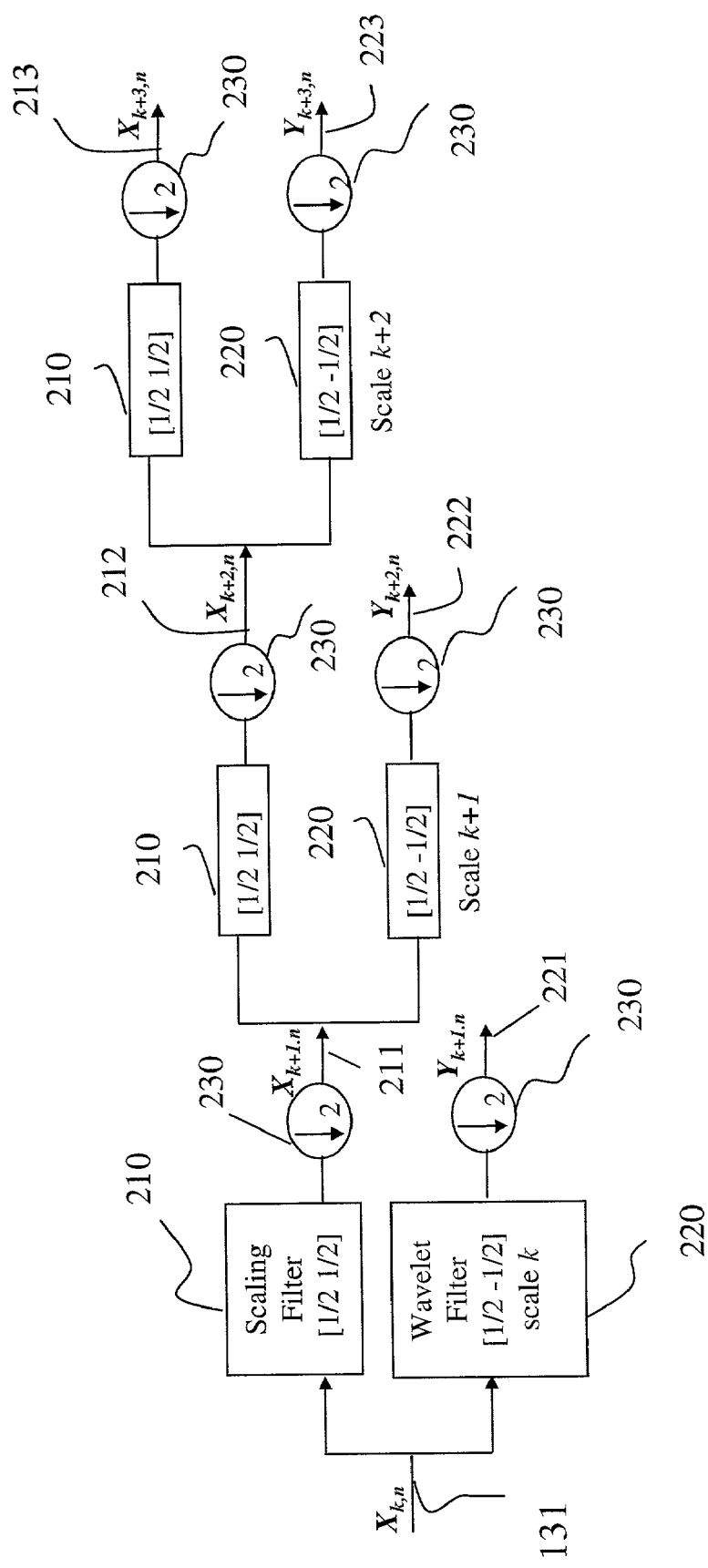
FIG. 2 is a block diagram of a dyadic tree structure with Haar wavelet filters of a discrete wavelet transform block of the system of FIG. 1b.

Therefore, as shown in FIG. 2, we pass the buffered arrival rate vector $X_{k,n}$ 131 through a dyadic tree of scaling filters 210 and wavelet filters 220, where each branch produces a low frequency component $X_{k+1}$ 211, and 212, 213 respectively and a high frequency component $X_{k+1}$ 221 of $X_{k,n}$ and further 222 and 223. The output of each scaling filter 210 is down-sampled 230 by a factor of two. In other words, the output of each scaling vector 210 generates pair-wise average arrival rate vectors 211, 212 and 213, and the output of the each wavelet filter 220 generates pair-wise rate arrival differences 221, 222 and 223.

The scaling and wavelet coefficient vectors of the Haar wavelet are $\Phi=[1/\sqrt{2}1/\sqrt{2}]$ and $\Phi=[1/\sqrt{2}-1/\sqrt{2}]$, respectively. We know that for $\forall n,k$, all $X_k(n) \geq 0$. As stated above, wavelet domain modeling of positive processes requires the constraint that a positive output is ensured. To guarantee the constraint that the process is positive, the sufficient and necessary condition is $|Y_k(n)| \leq X_k(n)$. The provision of this constraint for the Haar wavelet is seen by modifying Equations 3 and 4 such that $$X_k(2i-1) = 2^{-1/2}(X_{k+1}(i)+Y_{k+1}(i)), \text{ and} \tag{5}$$

$$X_k(2i) = 2^{-1/2}(X_{k+1}(i)-Y_{k+1}(i)). \tag{6}$$

The Haar wavelet coefficients of a stationary signal are identically distributed with $E[Y_k(n)]=0$ for $\forall k$. Therefore, applying the discrete Haar wavelet transform 200 on the measured arrival rate data 131 reveals irregularities and sharp changes in traffic behavior.

Having R as a M×M wavelet transform matrix composed of parameters of vectors $\phi$ and $\Phi$, and X as the vector data with length M, the wavelet transform operation can be expressed as W=X.R, where W is the wavelet transform vector with size M. DWT block outputs vector W 600

Energy of a stochastic process X at scale k can be determined from W 600 by $$E_k = \sum_{n=2^{k-1}+1}^{2^k} |W(n)|^2, k : \text{scale index}. \tag{7}$$

Multi-resolution Energy Distribution Analysis

Energy distribution in multi-resolution analysis provides information about the level of traffic burstiness and self-similarity. Therefore, consideration of energy contents of a signal at different time scales in the dynamic bandwidth allocation method according to the invention has strong advantage over prior methods to prevent the impacts of traffic self-similarity.

Figure 6A:
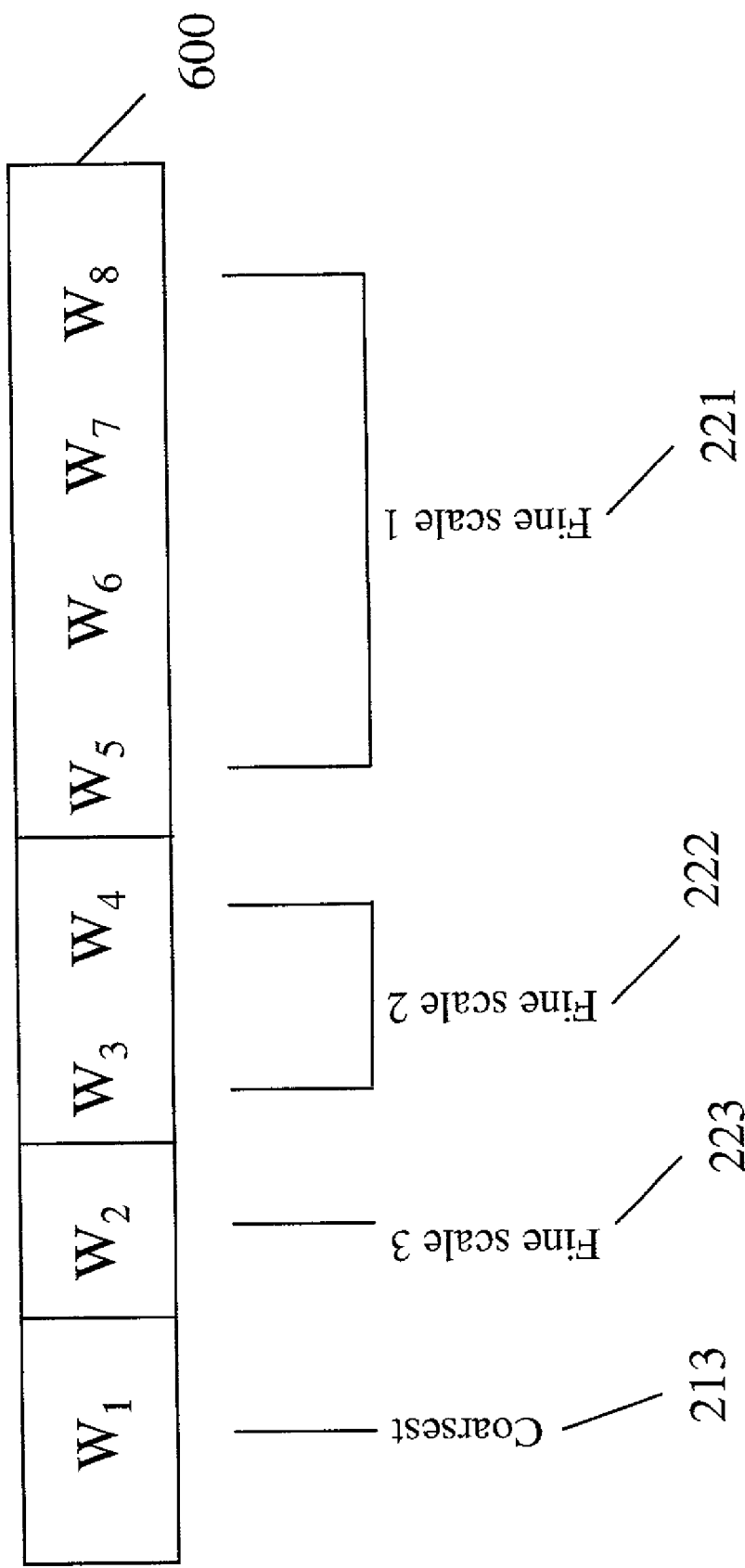
FIG. 6a is a block diagram of a wavelet transformed data coefficient vector.
Figure 6B:
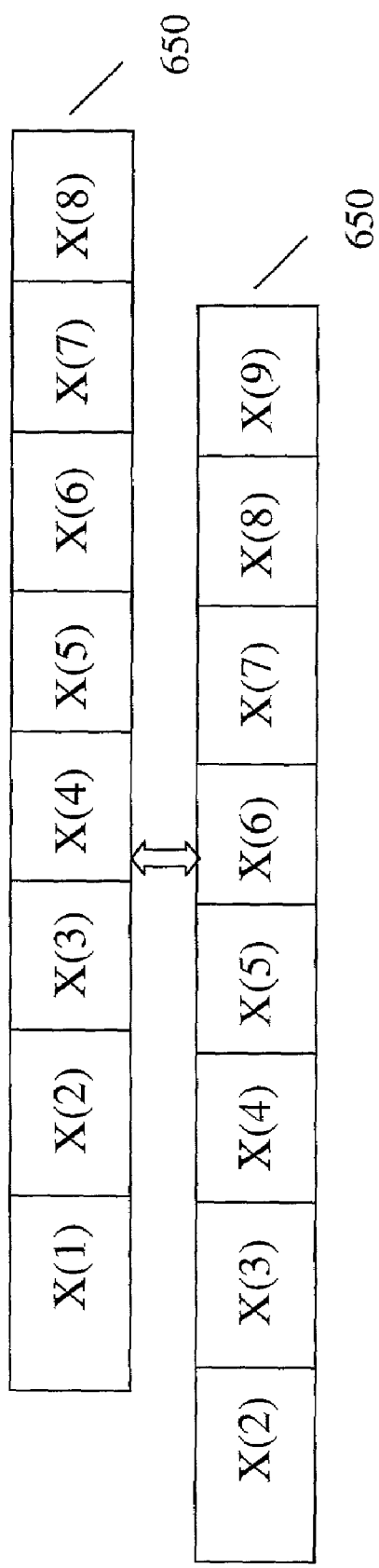
FIG. 6b is a block diagram of two adjacent overlapping vectors.
Figure 7:
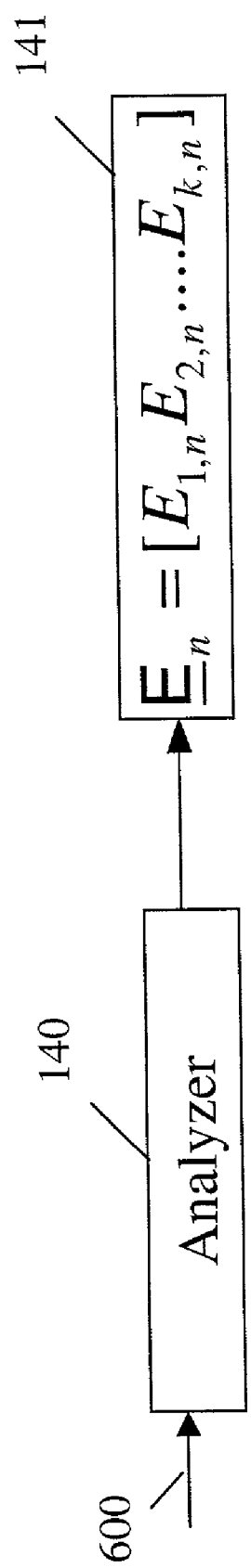
FIG. 7 is a block diagram of output from an analyzer.

We define two moving windows: a "data unit" and a "wavelet unit." A moving data unit 650 illustrated in FIG. 6b, covers eight most recent measured data arrival rate samples 131 to be analyzed. Each window of samples X 650 overlaps a previous window as shown in FIG. 6b between two consecutive measurements. In FIG. 6a, our wavelet transformed data vector W 600 uses a window of eight samples, the same size as of "the data unit" so that our multi-resolution process can respond to sudden changes in data rates. The area covered by this window is denoted as a "wavelet unit," WU. We use the wavelet unit $W = RX = [w_1 w_2 w_3 w_4 w_5 w_6 w_7 w_8]$

600 to represent the transformed data.

The analyzer 140 takes the vector W 600 produced by the DWT 200 as input, and then computes and forwards the energy information 141 in each sub-band to the RAM 800. Energy of the stochastic process X at scale k in the dyadic tree is determined by Equation 7, and yields energy vector $E_n[E_{1,n}, [E_{2,n}, \ldots, [E_{k,n}]$ 141.

Figure 5:
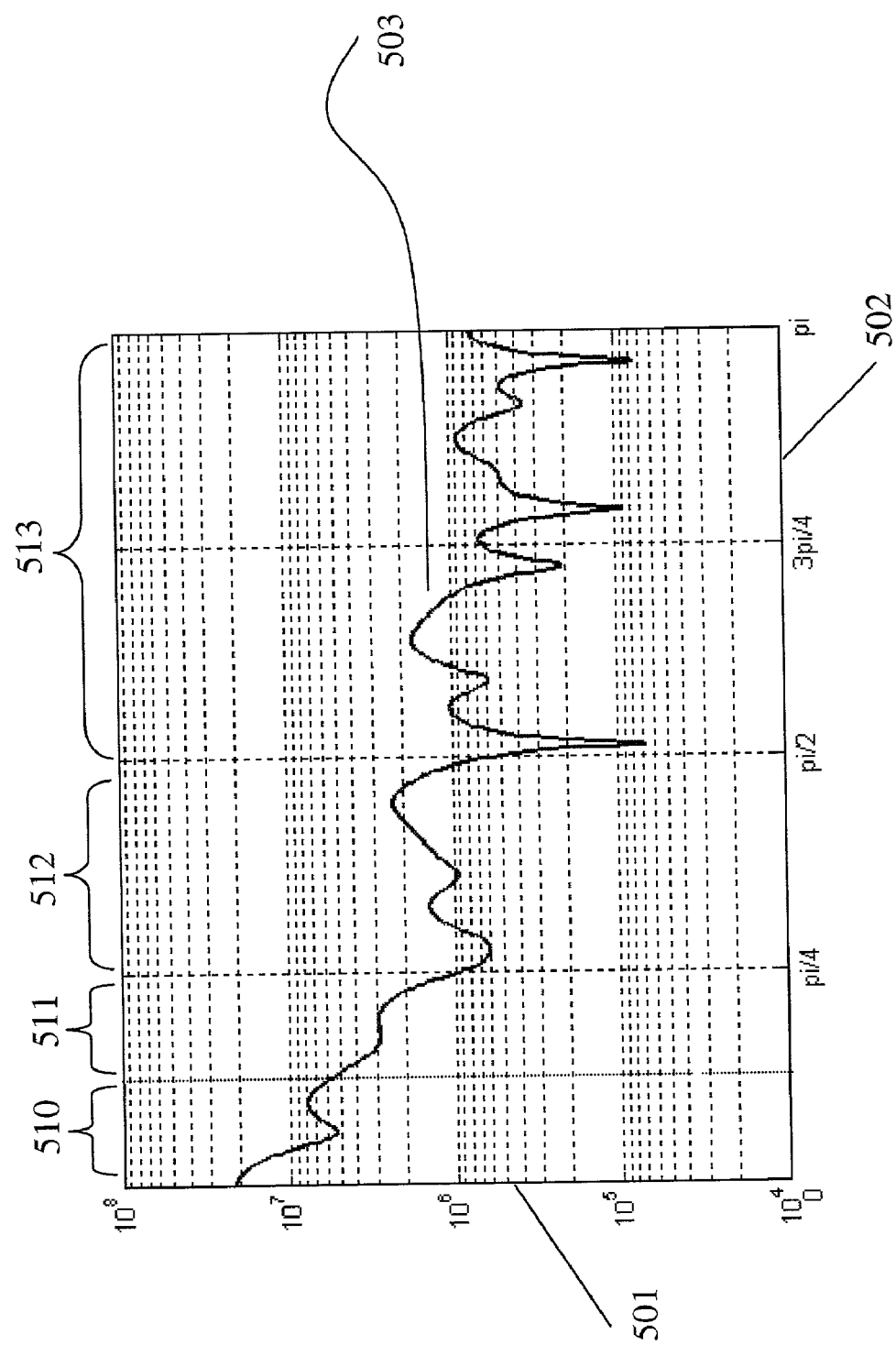
FIG. 5 is a partitioned graph of a frequency spectrum.

As shown in FIG. 5, energy 501 in each scale 510–513 is found by applying Equation 7 to the wavelet transform unit vector W 600. The x-axis 502 is in units of radians. Scale 513 reveals the highest frequency detail within the original traffic data 503. The detail is expressed by four coefficients. The detail in scale index 512 is assigned to two coefficients. The first two element 511 and 510 in vector W 600 stands are assigned one element of coarser scales.

The sum of the energies in each frequency band is bounded by the total energy of original data X. Strong empirical evidence contends that the wavelet coefficients from 1/f processes are weakly correlated both along and across the scales. Abry et al., in "*Wavelet Analysis of Long Range Dependent Traffic,*" IEEE Trans. Inform. Theory, V:44, pp. 2–15, Jan. 1998, and Sahinoglu et al., in "*Self-similarity and Its Effects on Network Performance,*" IEEE Comm. Magazine, January 1999, describe that for the Haar wavelet, the variance progression of the wavelet transform of fractional Gaussian noise satisfies $\text{var}(W_k(n)) \propto 2^{-k(2H-1)}$.

The ratio of the energies in two subsequent scales can then be related to the Hurst parameter H as $$\gamma = \frac{\text{var}(W_k(n))}{\text{var}(W_{k+1}(n))} = 2^{2H-1},$$

see R. Riedi, M. S. Crouse, V. J. Ribeiro, R. G. Baraniuk, "*A Multifractal Wavelet Model with application to Network Traffic,*" IEEE Trans. On Information Theory, V:45, N:3, April 1999. The stability of the arrival rate is proportionally related to the increase in this ratio.

Resource Allocation Mechanism (RAM)

We define and use the following properties of frequency and energy distribution in the RAM 800.

Property-I

If for $\forall i,j$, $X(i)=X(j)$ where $0<i,j<N$, $i\neq j$ and $ij\in Z^+$, the energy content in each high frequency band becomes zero, and traffic is considered to be constant bit rate (CBR). In this case the entire energy of the input data is present within the lowest frequency band. The bandwidth to allocate to this type of traffic must be equal to $X(i)$.

Property-II

If the elements of X show an increasing characteristic over time such that $X(n)>X(n-1)$ $n=2, 3 \ldots, N$, then the energy distribution in each frequency band increases from finest to a coarser scale, being the lowest in the highest frequency region, $E[E_{j+1}]>E[E_j]$. The RAM unit increases the bandwidth demand for the next time slot and sends this request to the DBC 900.

Property-III

A decrease in the coarse scale energy while the fine scale energies are stable is an indicator of a linear decrease in traffic volume. Less bandwidth than that in the previous time slot is needed. A request to lower the bandwidth allocation is sent to DBC from RAM.

Property-IV

Assume that $V_i$ stands for the variance of the energies among k scales in time slot i, $M_i$ stands for the mean value of energy contents, and $U_i$ stands for the utilization.

Therefore, the following statements hold.

$V_{i+1}>V_i$ and $M_{i+1}<M_i \Rightarrow U_{i+1}<U_i$

This is representative of possibly approaching "OFF" interval, or departing flows in case of aggregate traffic. The request to decrease the bandwidth allocation is sent to the DBC.

$V_{i+1}>V_i$ and $M_{i+1}>M_i \Rightarrow U_{i+1}>U_i$

This is representative of added flows to the aggregate traffic or an approaching "ON" interval. The request to increase the bandwidth allocation is sent to the DBC.

$V_{i+1}<V_i$ and $M_{i+1}<M_i \Rightarrow U_{i+1}<U_i$

This is representative of traffic is getting smoother. In this case no bandwidth renegotiation is required.

$V_{i+1}<V_i$ and $M_{i+1}>M_i \Rightarrow U_{i+1}<U_i$

This is representative of traffic getting smoother with increased utilization Therefore, the request for increase in bandwidth is sent to the DBC After receiving a request for bandwidth renegotiation and the amount of bandwidth to allocate in the next time slot, the DBC 900 uses a threshold table that comprises the previous energy statistics and decides whether to grant the request, or not.

Figure 8:
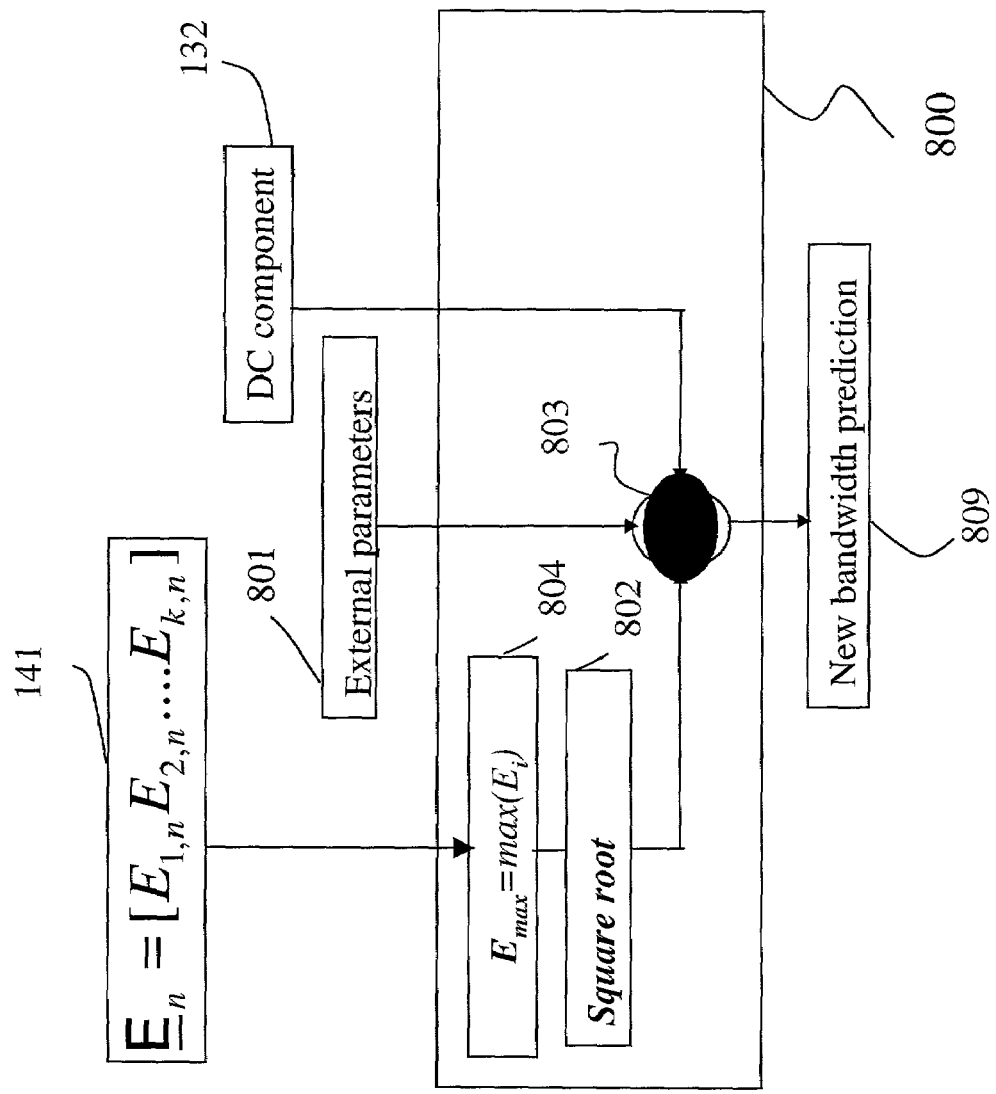
FIG. 8 is a block diagram of a resource allocation block of the system of FIG. 1b.

FIG. 8 shows the RAM 800 that receives the energy vector 141 from the analyzer. The RAM also receives external feedback parameters (buffer statistics) 801, e.g., momentary buffer size, packet/cell loss rate, and the minimum non-zero value $X_{DC}$ 132 of the integer vector 131 produced by the shift register 130.

Figure 9:
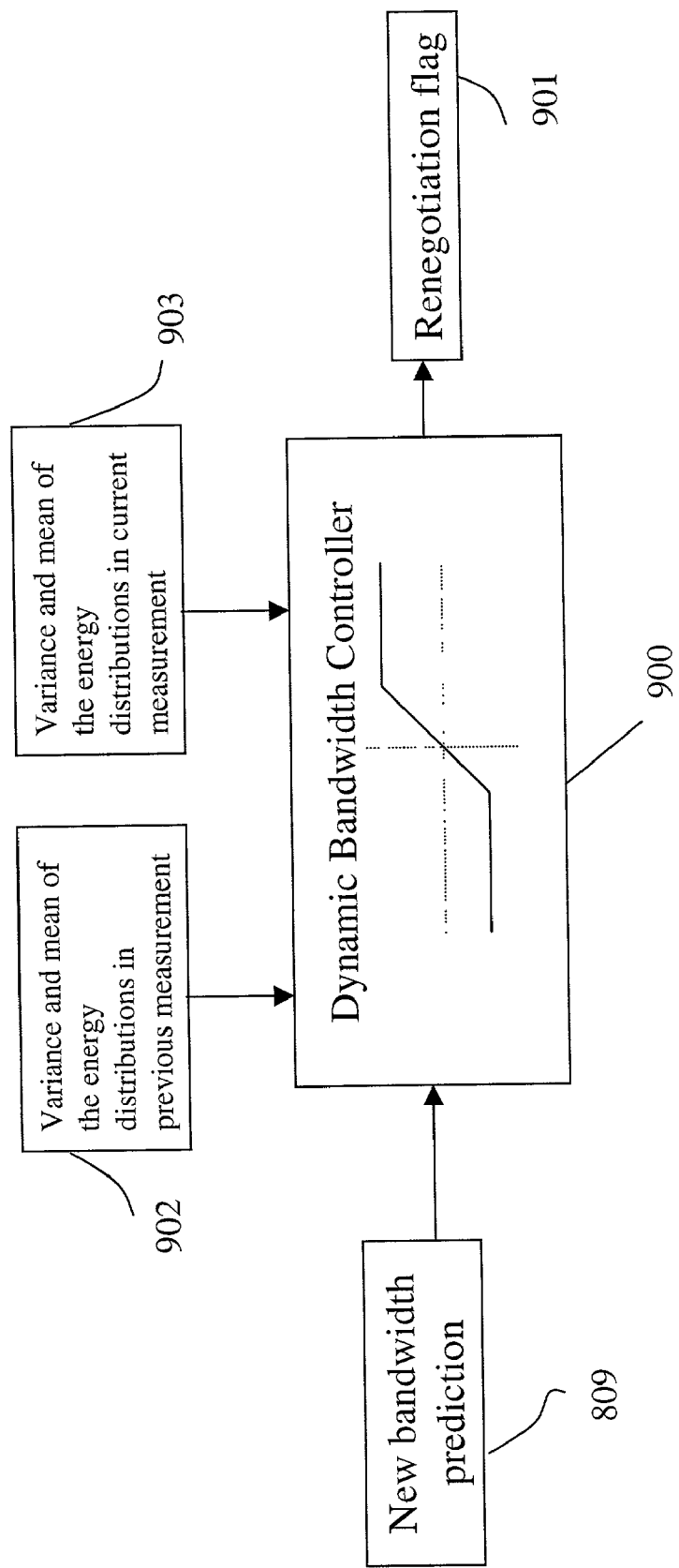
FIG. 9 is a block diagram of the dynamic bandwidth controller block used by the system of FIG. 1b.

FIG. 9 shows the dynamic bandwidth controller unit 900 which takes the variance and mean of the energy distribution in previous measure 902 and the current measure 903, and the new bandwidth prediction 809 from RAM 800 and decides if to start a resource renegotiation cycle with the network.

System Details

The system first filters out the minimum non-zero DC component $X_{DC}$ 132 in traffic measurements X 131. Effectively, the $X_{DC}$ 132 is a lower bound for the bandwidth allocation in a next time slot and is one of the contributing components in each bandwidth prediction. The signal 131 at the output of the M shift register 130 includes low and high frequency components. The signal 131 is fed into a filter bank in which high pass filters 220 are composed of Haar wavelet coefficients, and low pass filters 210 are composed of Haar wavelet scaling coefficients. The signal 131 is decomposed into three high frequency sub-bands 511–513, a coarse sub-band 510, as described above. Energies in each of the high frequency sub-band 511–513 are used as a representative of the traffic volume within that frequency band.

The traffic volume that generates the maximum energy $E_{max}$ 804 is computed. Because underestimation may cause the buffer congestion, while overestimation can only result in underutilization of the available bandwidth, we take the contribution of maximum energy content in each adaptation interval for the bandwidth allocation. The square root 802 of $E_{max}$ 804 returns a signal that would have the energy amount $E_{max}$ 804. This equivalent signal, the square root of $E_{max}$ is added to 132 by 803 as the second component to the new bandwidth prediction. The new prediction is also compensated with the present queue size 801 to flush the queue contents to prevent building up delays.

Finally, the new prediction 809 takes the form in Eq. 8

$$BW(n+1)=X_{DC}(n)+\max(E_n(i))+\text{queue\_size}(n) \quad (8)$$

We can also modify the RAM 600 so that the buffer size information 801 is not needed for bandwidth renegotiation. This can be done without degrading the queuing performance and without increasing the capacity underutilization.

In a first modification, the RAM 600 method compensates the new bandwidth allocation by including a component with energy equivalent to the superposition of all the energies $$BW(n+1) = X_{DC}(n) + \sum_{i=1}^{K} \sqrt{E_n(i)}.$$

Here, the value K is the number of high frequency sub-bands into which the data are decomposed.

In a second modification, the bandwidth compensation is provided as the sum of K components, each of which is representing a bandwidth contribution such that the energy of each component is the same as the energy in one of the sub-bands.

$$BW(n+1) = X_{DC}(n) + \sqrt{\sum_{i=1}^{K} E_n(i)}.$$

Each sub-band is represented only by a single component.

A third modification, Eq. 11, determines the new prediction as $$BW(n+1) = \underline{W}_n(1) + \sum_{i=1}^{K} \sqrt{E_n(i)},$$

where $$\underline{W}_n(1) = \frac{1}{M} \sum_{i=1}^{M} X_{k,n}(i),$$

that is the average of a data unit $X_{k,n}$ 131, or in other words the first element in W 600.

A fourth modification, determines $$BW(n+1) = \underline{W}_n(1) + \sqrt{\sum_{i=1}^{K} E_n(i)}.$$

The condition $W_n(1) > X_{DC,n}$ in time slot n is always true. Therefore, it is clear that the third and fourth modifications allocate more bandwidth in each renegotiation than the first and second modifications.

Figure 10:
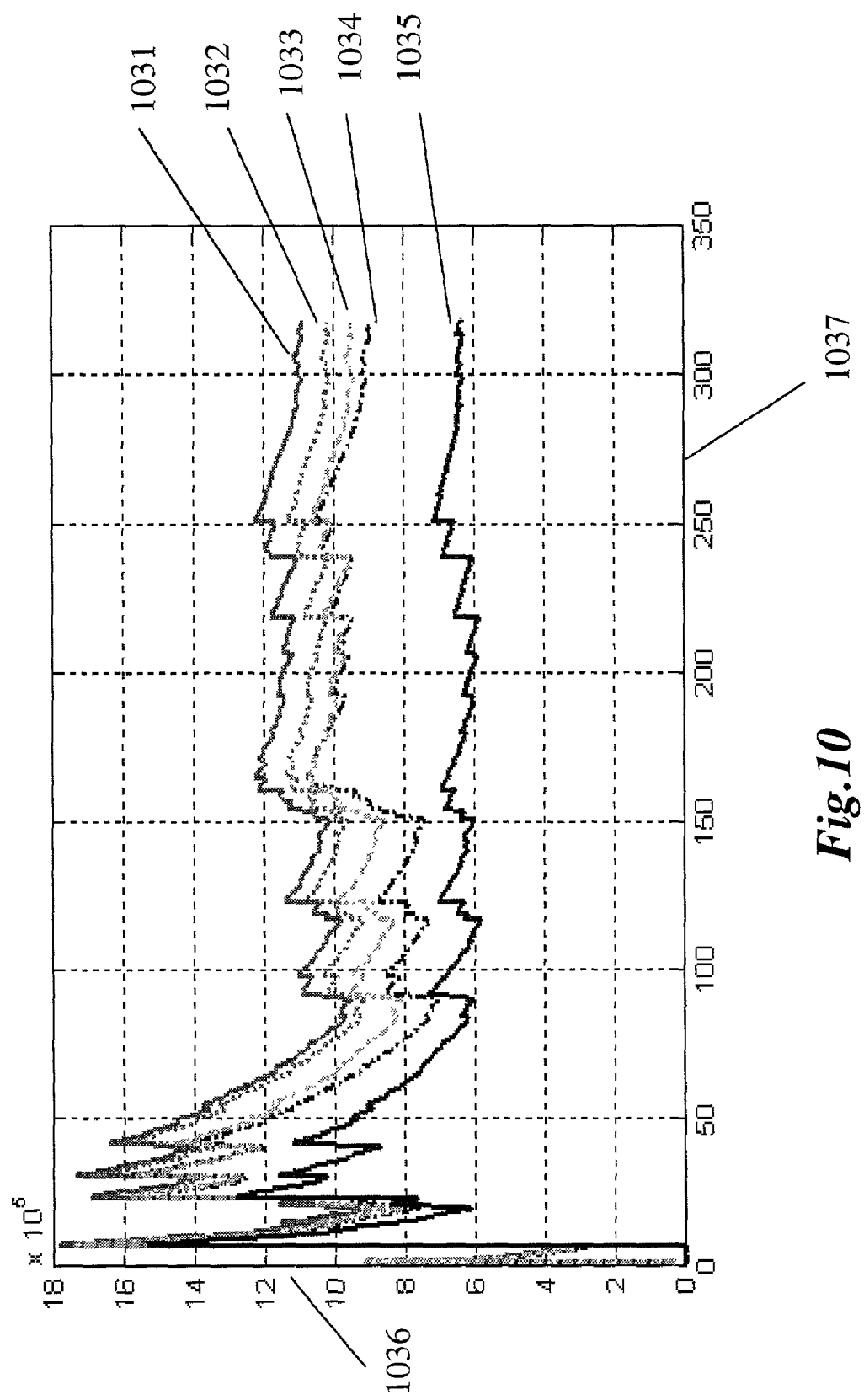
FIGS. 10 and 11 are graphs comparing queue size performances.

FIG. 10 compares the queuing performance 1035 of the wavelet-energy method according to the invention with the queuing performances 1031–1034 of four traditonal approaches where the x-axis 1037 is the index of a time slot, and the y-axis 1036 is the average queue size.

Figure 11:
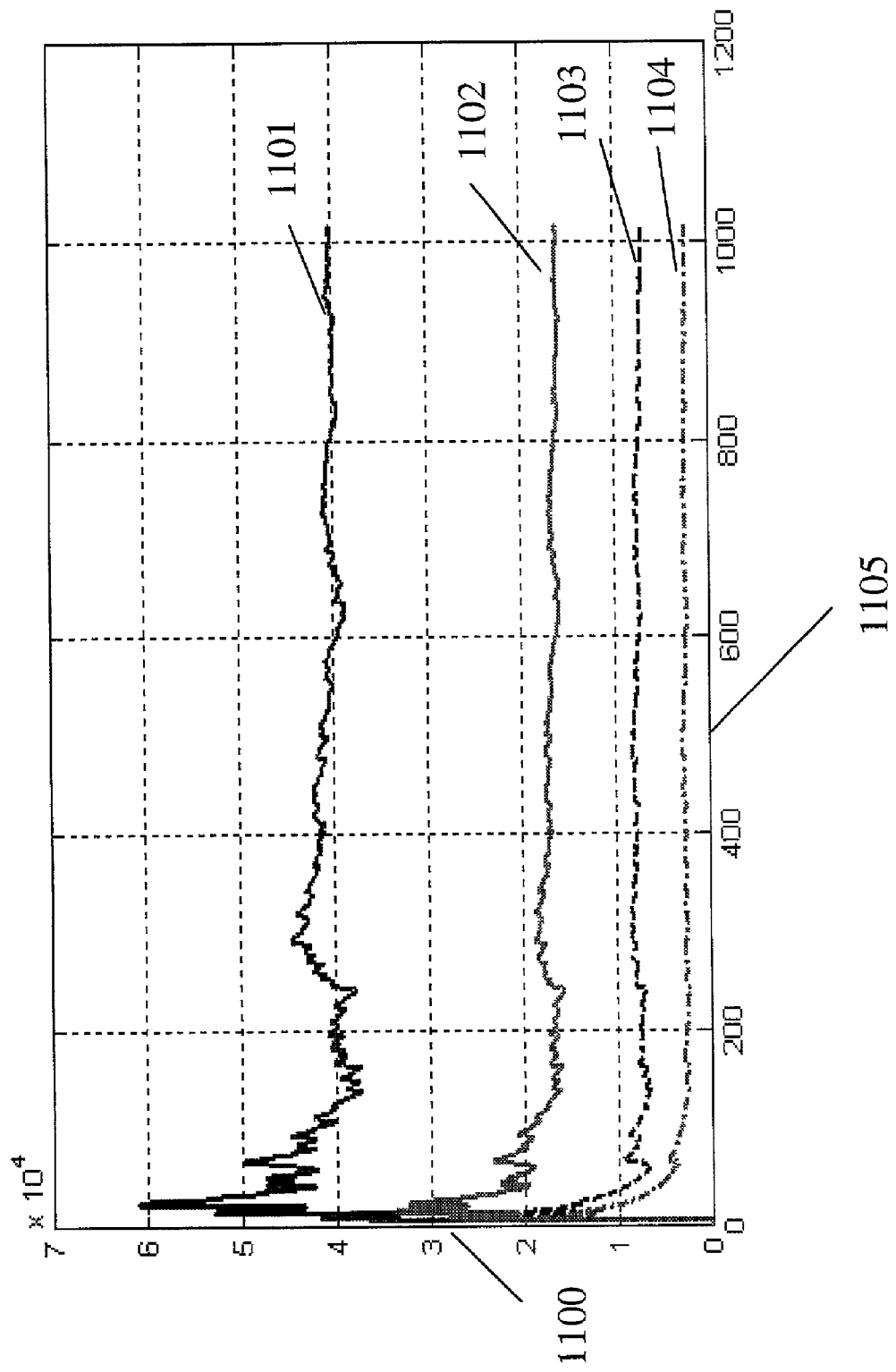

FIG. 11 compares the queuing performances 1101–1104, in a top to bottom order, of the four modified wavelet-energy methods described above where the x-axis 1105 is the index of a time slot, and the y-axis 1100 is the average queue size.

Figure 12:
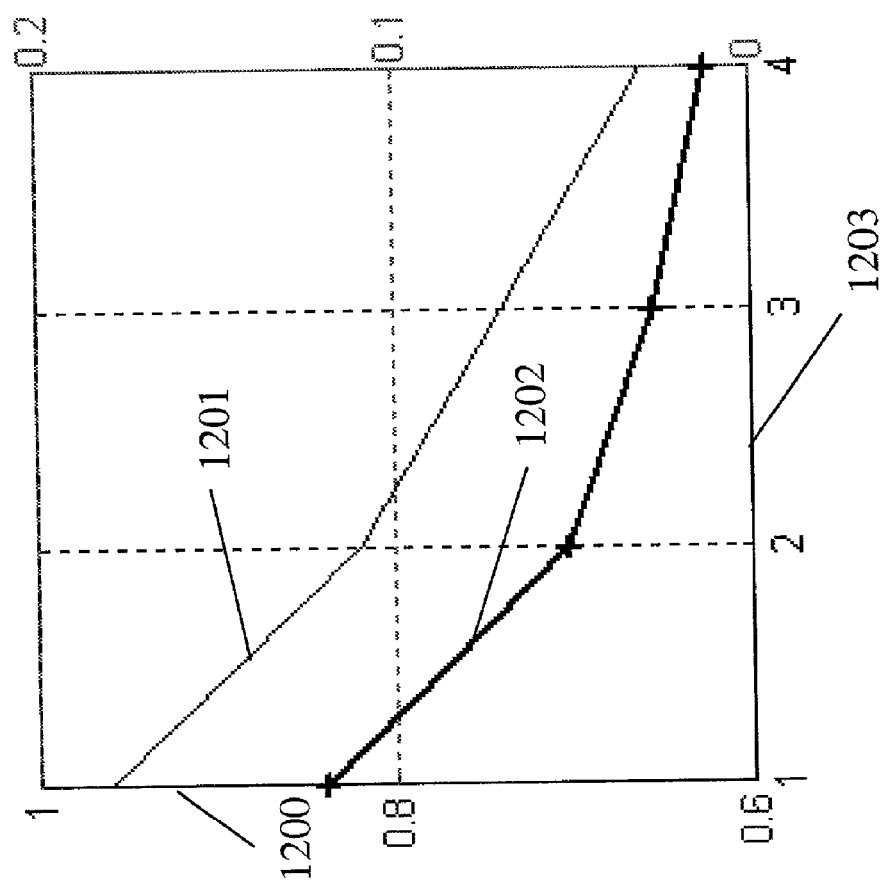
FIG. 12 is a graph comparing average queue size and utilization.

FIG. 12 compares the trade between average utilization 1201 and average queue size 1202 for the four modified wavelet-energy RAM methods where the x-axis 1203 is the index of a time slot, and the y-axis to the left 1200 is average utilization and y-axis to the right is average queue size.

Predicting bandwidth requirements using the wavelet-energy method as described above yields better performs than prior art techniques. The invention also enables smaller queue sizes at a minimal expense of increased bandwidth utilization.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for dynamically allocating bandwidth to traffic having a variable data rate in a network, comprising:
    measuring a data rate of the traffic received from the network during fixed length time intervals;
    grouping a predetermined number of consecutive data rates into overlapping vectors;
    applying a discrete wavelet transform to each overlapping vector to determine frequency bands for each vector;
    analyzing the frequency bands of each vector to determine an associated energy of the data rate; and
    allocating the bandwidth to the traffic according to the associated energy when the traffic is transmitted.

2. The method of claim 1 wherein the bandwidth is allocated in a weighted fair queuing process.

3. The method of claim 1 wherein the bandwidth is allocated in a quality-of-service management block of the network.

4. The method of claim 1 wherein a clock sets time intervals $$\sum_n \delta(t-nT)$$

at a clock rate of $$\frac{1}{T}$$

for a data counter.

5. The method of claim 1 wherein the predetermined number of consecutive data rates are grouped into the overlapping vectors in a shift register of length eight.

6. The method of claim 1 wherein the discrete wavelet transform is performed by a Haar wavelet filter bank.

7. The method of claim 1 further comprising:
    receiving buffer statistics and a minimum non-zero data rate as feedback while allocating the bandwidth.

8. The method of claim 1 wherein each overlapping vector is in terms of $X_k=[X(n-M+1)X(n-M+2)\ldots X(n)]$, where M is eight, and n is an instance in time.

9. The method of claim 1 wherein an average data rate for M consecutive time intervals is $$X_{k+1} = \frac{1}{2} \cdot [X(n-M+1) + X(n-M+2)X(n-M+3) + X(n-M+4) \ldots X(n-1) + X(n)]$$

at a time scale of k+1, and a difference of data rates between two consecutive time intervals is $$Y_{k+1} = \frac{1}{2} \cdot [X(n-M+1) - X(n-M+2)X(n-M+3) - X(n-M+4) \ldots X(n-1) - X(n)]$$

where n is a time instance, k is a time scale, and M is an integer.

10. The method of claim 1 wherein the associated energy is expressed as $E_n[E_{1,n}, [E_{2,n}, \ldots, [E_{k,n}]$.

11. The method of claim 1 wherein a sum of the energies in each frequency band is bounded by a total energy of the traffic.

* * * * *